Nov. 13, 1934.  W. J. EDMONDS  1,980,718

CATALYTIC APPARATUS

Original Filed Oct. 6, 1928

INVENTOR.
William J. Edmonds
BY
Francis M. Crawford ATTORNEYS.

Patented Nov. 13, 1934

1,980,718

UNITED STATES PATENT OFFICE 1,980,718

CATALYTIC APPARATUS

William J. Edmonds, Baytown, Tex., assignor to Commercial Solvents Corporation, Terre Haute, Ind., a corporation of Maryland Original application October 6, 1928, Serial No. 310,843. Divided and this application December 18, 1929, Serial No. 415,085

4 Claims. (Cl. 23—289)

The present invention relates to the catalytic synthesis of materials through high pressure catalytic reaction. More specifically, the invention comprises a novel process and apparatus employed in the manufacture of valuable products by direct synthesis from their component gases which are passed at high temperatures under pressure over a catalyst mass, as for example, the manufacture of methyl alcohol or methanol from carbon monoxide and hydrogen, or the production of synthetic ammonia from a gaseous mixture of nitrogen and hydrogen in their combining proportions. In any instance the elements should be combined in their respective proportions in the gaseous mixture and then compressed to relatively high pressures and passed under such pressure over a suitable catalytic agent capable of stimulating the combination of the two gases whereby sufficient heat is produced to maintain the temperatures required for satisfactory yields.

The art of synthesizing methanol has now become well established in the literature. Among the United States patents upon the subject that may be mentioned are Patents 1,558,559; 1,608,643; 1,609,593; and 1,624,924; 1,624,925; 1,624,926; 1,624,927; 1,624,928; and 1,624,929.

When a mixture of hydrogen with carbon monoxide or carbon dioxide, or a mixture of the two oxides, is passed over a catalytic mass comprising a mixture of metals or their oxides at a pressure in excess of 100 atmospheres and at a temperature of about 350–450° C., methanol is produced. In case pure carbon monoxide is employed, the product obtained will be practically pure methanol, but in case of the dioxide, a molecule of water is produced for each molecule of methanol formed. In practice, all of the gaseous mixture does not react on the first contact, and the residual, unreacted gases are circulated again and again over the catalyst, the reaction product being cooled each time to separate out the methanol (or methanol and water) in liquid form.

Best results are obtained when the proportion of hydrogen present is in excess of the amount theoretically required to react with the carbon oxides present, but a strict proportioning of the ingredients present is not necessary to the success of the process. The amount of gases converted to methanol on each passage through the catalyst will depend upon the catalyst activity, the temperature of the reaction, the space velocity, and a number of minor factors.

The present invention relates to a methanol process and apparatus which is not limited to the use of any specific catalyst or gas proportion. It relates to a method and apparatus by which the methanol catalyst is kept at a uniform temperature, and by which the necessary heat is supplied by the exothermic reaction itself. The heat given off by the reaction is conserved within the reaction vessel where it is used to heat the incoming raw materials and also to maintain the catalyst temperature. This type of process is known as an "autothermal process".

Another advantage of the invention lies in the close control of the catalyst temperature which is made possible by the process and apparatus herein set forth. The optimum reaction temperature is in the neighborhood of 400° C. and when any part of the catalyst reaches a temperature much in excess of 400° C., the reaction taking place at that point no longer produces pure methanol, various undesirable by-products being obtained. In addition to this bad effect, a worse one is likely to occur, namely, that a temperature much in excess of the optimum reaction temperature may also destroy the activity of the catalyst itself.

On the other hand, if the catalyst, or any part of it, is cooled from the optimum temperature, the methanol process will operate inefficiently, and the degree of conversion will be less than the maximum possible. For the reasons outlined, it is important that every portion of the catalyst be maintained at exactly the optimum reaction temperature. The invention provides a means and process for doing this.

As previously stated, the reaction of hydrogen with carbon oxides to produce methanol is an exothermic one. The reaction of pure carbon monoxide with hydrogen is more highly exothermic than the reaction of carbon dioxide with hydrogen. Various figures have been given in the literature which purport to give the heat generated by the two reactions:

$$CO + 2H_2 = CH_3OH, \text{ and}$$
$$CO_2 + 3H_2 = CH_3OH + H_2O,$$

and while the specific figures given may be open to question the basic fact that more heat is given off in the case of the reaction of carbon monoxide is not open to dispute.

Hence it might appear at first glance that autothermal operation could be much more easily achieved in the case of the first instance than in the second. However, the industrial operation of the methanol process is not based on the use of pure gases. No matter whether pure carbon monoxide or dioxide is introduced into the process, in the circulating system itself both gases will be present, owing to various side reactions. Further, the reacting gases are not introduced in precise molecular proportions, and consequently there is always some extra hydrogen present which absorbs heat from the catalyst on each passage through it and gives up that heat when the reaction product is cooled to condense out liquid methanol. For the reasons mentioned, the practical difficulties of achieving autothermal operation and close control of catalyst temperature are of the same order no matter whether carbon monoxide or carbon dioxide is used as the principal carbon oxide entering the reaction, though autothermal operation is rendered easier in the case of carbon monoxide by the somewhat greater heat of reaction.

The present invention provides means whereby the temperature of the catalyst is controlled so that the optimum reaction temperature is maintained while overheating of the catalyst is prevented.

The nature of this present process and apparatus may best be understood in connection with the drawing forming a part of this specification.

In the drawing.

Identical reference numerals are used throughout the several views.

Figure 1:
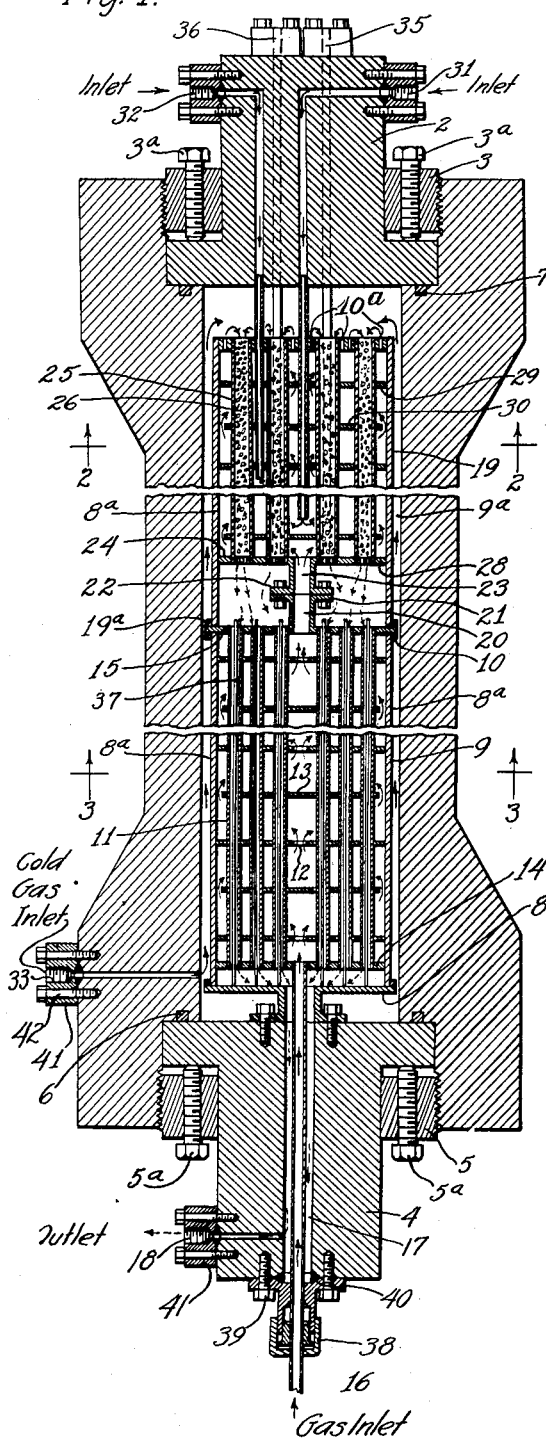
Fig. 1 represents a cross-sectional elevation of the converter taken through its center.
Figure 2:
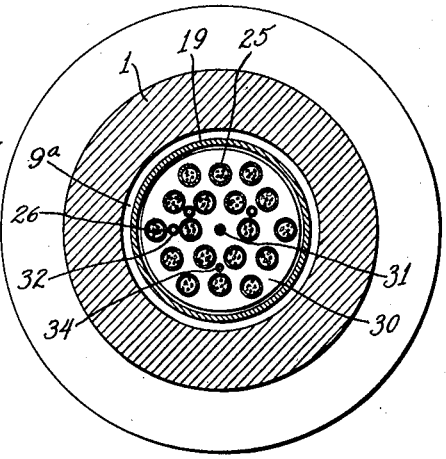
Fig. 2 is a sectional view of the converter taken on the line 2—2 of Fig. 1.
Figure 3:
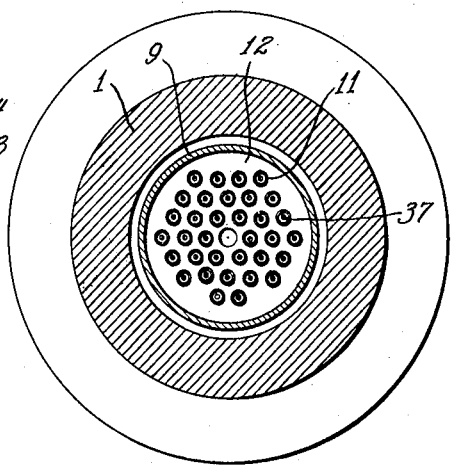
Fig. 3 is a similar view taken along the line 3—3 of Fig. 1.

In Fig. 1, the reference numeral 1 represents the pressure resistant and corrosion resistant wall of the converter. In practice, this may be composed of chrome-vanadium steel, or some similar alloy, and may be internally lined or plated with copper or chromium. The member 1 is actually an elongated tube, both ends of which are closed by similar structures. The top of the member 1 is closed by a plug 2, which rests on small shoulders on the internal wall of 1. A pressure tight joint is obtained by means of pressure exerted on the plug shoulders by means of a ring 3, which is thread connected to the tube 1. The ring 3 receives the pressure screws 3a, which bear against the shoulders on the plug 2.

The bottom of the tube 1 is similarly closed by the plug, or lower head 4, which also engages small shoulders on the internal wall of 1, similarly as described above, and again a pressure tight joint is obtained by means of pressure exerted upon the plug shoulders by means of the ring 5, which receives the pressure of the screws 5a, bearing against the shoulders on the plug 4. The ring 5 is thread-connected to the tube 1; all similar to the construction already described. The lower and upper plugs, or heads, are thus held in engagement with the gaskets 6 and 7, respectively, as shown in Fig. 1, the action of these gaskets contributing to form pressure tight joints under the action of the pressure applied to the respective heads.

While the tube 1 is actually a long integral part, the drawing has been shortened as will be seen from an inspection thereof.

The plug has firmly secured to it in any convenient manner, the member 8, serving as a supporting flange for the structure to be hereinafter described.

Inside the tube 1, and supported by the flange 8, there is positioned a structure in the form of another tube and indicated generally by 8a. This structure, hereinafter referred to as a "bomb", may consist of copper, or of alloy steel plated with copper or chromium. Between the tube 1 and the bomb 8a, there is an annular space 9a through which gases may travel as will be later described. The bomb 8a is closed at both top and bottom, but its interior is in communication with the space 9a at the top of the bomb 8a, the communication being through the ports 10a, these ports passing through a tube spacer header functioning as hereafter described and forming the top closure for the bomb 8a.

Within the bomb 8a, there is positioned a catalyst basket, catalyst, and a heat exchanger. The component parts of these may be best understood in their relation to the chemical process which takes place within the converter. For this reason, in further describing the apparatus and process it will be assumed that the catalyst is at the optimum reaction temperature and that a mixture of hydrogen and carbon oxides is passing through this converter and contacting with the catalyst where a portion of the gas reacts to form methanol, and that the cooled residual hydrogen and carbon oxide mixture is being added to the raw gases passing into the bomb.

As will be seen from Fig. 1, the bomb 8a is conveniently formed of two sections, one of which contains the catalyst and basket, and is therefore the reaction chamber, while the other section serves as a preheater for the reactants.

Referring to the preheating, or heat exchanging, chamber, it will be seen that this is defined by a shell 9, provided with an annular flange 10, and containing a plurality or nest of heat interchanger tubes 11, and a plurality of baffles 12 and 13, the baffles 12 having center openings while baffles 13 have side openings. It will be seen from Fig. 1 that the lower end of shell 9 is closed by the supporting flange 8, and the shell and flange are firmly secured to each other, as for instance, by welding, and the flange and shell are conveniently formed of the same materials or of materials having approximately the same coefficient of thermal expansion so that the union between the shell and flange will be maintained under all conditions. The tubes 11 are maintained in proper spaced apart relation by the headers 14 and 15, through which the tubes pass.

It will be seen that the header 14 is spaced from the flange 8, and that the flange and plug 4 are provided with registering passageways extending through each of these members, thus forming a continuous passageway or opening communicating with the interior of the heat exchanger. The gas inlet pipe 16 passes through this opening, and also through the header 14, the inlet pipe 16 discharging the incoming gas into the heat exchanger around the tubes 11, there being a continuous annular passage 17 between the inlet pipe and the flange 8, and plug 4, this passage serving as a conduit to lead the reaction products from the heat exchanger to the outlet 18. It will therefore be seen that the incoming reactant mixture discharges from the pipe 16 in close proximity to the heat exchanger tubes 11, and envelops these tubes as it passes to the reaction chamber, and is warmed as it passes because of heat exchange with the hot reaction products passing interiorly of the tubes 11 from the reaction chamber to the discharge, the baffles 12 and 13 causing the reactant mixture to follow a sinuous course, passing through the center of baffles 12 and outside around the circumference of baffles 13, thus being brought into intimate and efficient thermal contact with the tubes 11. The baffles 12 and 13 are secured in position by any convenient way, as for example, by brazing them upon the tubes 11.

The heat exchanger communicates with the reaction chamber, which is defined by the shell 19 having a flange 19a corresponding to the flange 10 of the shell 9. When the bomb is assembled, the heat interchanger header 15 is secured between the flanges 10 and 19a. It will be seen that the header 15 is provided with an opening 20, conveniently centrally located, and a flange 21, adapted to receive a flange 22 defining a passage 23 through the header 24, which acts as a header for the catalyst tubes as will be hereafter mentioned, the flanges 21 and 22 being secured together in any desired manner as by bolting or riveting, the passages 20 and 23 registering with each other to form a continuous conduit for the passage of the reactants from the heat exchanger to the reaction chamber, the reaction chamber contains a plurality of tubes 25 to hold the catalyst 26, the catalyst being of such character as will favor the desired reaction. The tubes 25 are held in the desired position by the top spacer header 27 and the bottom header 24, the catalyst 26 being retained in the tubes by the grid 28. The reaction chamber is also provided with baffles 29 and 30, entirely analogous to the baffles 12 and 13 in the heat exchanger.

In view of the fact that the reaction is an exothermic reaction, it is found desirable to control the temperature of the catalyst to prevent overheating of the same. For this purpose, means are provided for introducing cold reactant mixture into the gas passages outside the catalyst tubes. This is accomplished by the provision of a plurality of by-pass inlet tubes such as indicated at 31 and 32, the discharge ends of these tubes being so positioned with respect to the catalyst tubes that overheating throughout the catalyst mass is effectively prevented. For example, some of the inlet tubes may discharge cold gas near the top of the catalyst tubes, others at the bottom of the catalyst tubes, and still others in intermediate positions, and it will be of course obvious that the number of these inlet tubes may be multiplied as many times as needed. There is also provided a by-pass inlet for cold reactants, indicated at 33, permitting the introduction of cold reactants into the space 9a between the shell 1 and the bomb 8a, this also exerting a cooling effect upon the contents of the bomb and on the converter wall. All gases introduced within the converter shell and bomb pass through the catalyst so that both the cold gases introduced for cooling and the preheated gas entering the reaction chamber by way of the heat exchanger pass through the catalyst and are converted into the desired products. The temperature is determined by means of pyrometers located in tubes placed in desired positions in the reaction chamber. Such tubes are indicated at 34, 35, and 36.

If desired, core rods 37, may be inserted in the heat exchanger tubes 11, so as to serve to regulate the heat exchange, or this may be accomplished in other ways, as by regulating the velocity of the gases passing through the converter.

It may here be noted that the inlet tube 16 passes through a stuffing box 38 secured in pressure tight relation with the plug or head 4 through the agencies of the pressure screws 39 and gasket 40. The gas outlet and each of the by pass inlets are provided with members such as shown at 41 which serve as connection members to connect the outlet and by pass inlets with lines leading to storage and supply, respectively. Each of the connection members is maintained in gas tight relationship with the converter shell by the action of pressure screws, such as 42, and gaskets, such as illustrated at 43. These members are screw threaded to receive their respective lines.

The course of the gases will be apparent from the drawing, the solid arrows indicating reactants, while the broken arrows indicate the reaction products.

To summarize, therefore, it will be seen that the converter shell 1 is made pressure tight by the upper head 2 and lower head 4 held in place against the gaskets 6 and 7 by the pressure of the retaining rings 3 and 5. The retaining rings have buttress threads as indicated on the drawing.

In the heat interchanger, the tubes 11 are expanded into the headers 14 and 15. If desired, core rods 37 may be placed in these tubes to increase the gas velocity through them, or this velocity may be regulated externally of the converter. The velocity of the gas passing on the outside of these tubes is accelerated by means of the baffles 12 and 13. The gas passes through the center of the baffles 12, and outside around the circumference of baffles 13.

The catalyst basket contained in the shell 19 consists of a number of tubes four to eight inches in diameter which are expanded into the tube header 24. At the bottom of each of these tubes 25 there is placed a catalyst supporting grid 28. On the outside of the tubes there are gas baffles as in the case of the heat interchanger itself. Pyrometer tubes 34, 35, and 36 are located at convenient points on the outside of these catalyst tubes. In addition to those shown, at least one pyrometer should be inserted in one of these catalyst tubes.

The novel features of this design include the method and means of controlling the temperature within the catalyst. This converter is intended in particular for use with carbon monoxide-hydrogen mixtures where the problem is that of removal of heat from the catalyst rather than that of preheating the entering gases. Most of the entering gases will enter through the main gas inlet 16 and will be heated up during its passage through the heat interchanger by thermal contact with the reacted gases passing counter currently inside the tubes. These warmed entering gases are then passed on the outside of the catalyst tubes 25, being further heated up. They may be combined with by-passed cold gases entering through 31. The temperature on the outside of the catalyst tubes at the bottom will be controlled at some predetermined point as indicated by the pyrometer 35. Again these gases may be further diluted with cold gas entering through the port 32 which terminates at a point about half way up the catalyst bed. The temperature at this point is again levelled off to decrease the gradient within the catalyst. There is a third by-passed gas inlet 33 provided at the bottom of the converter. The cold gas passes through the annular space described by the shells 9 and 19 and the shell 1. Heat is picked up from the wall which would otherwise be lost by radiation and the temperature of the combined gases entering the catalyst controlled as desired by regulation of the amount of gas entering at 33.

The reacted gases pass down through the tubes 11 and out of the converter through the outlet 18.

Although the converter herein set forth is illustrated and described as being installed in a vertical position, it will be understood that the angle and plane of installation is not material to the invention, and it will also be apparent that many details of the construction may be modified without departing from the inventive concept.

The direction of the flow of the gases through the converter is indicated by the arrows on the drawing. The course of the reaction which permits autothermal operation and accurate control of the catalyst temperature consists in heating the cool incoming gases by thermal contact with hot gaseous reaction products. This heating increases the temperature of the incoming gases very substantially but does not heat them to the optimum reaction temperature. The heated gases are then passed in thermal contact with the catalyst itself (where the exothermic reaction is taking place), and this thermal contact not only raises the temperature of the incoming gases substantially to the optimum reaction temperature, but also serves to control the temperature of the catalyst itself in two ways:

1. To abstract heat from the catalyst so that its temperature will not rise above the desired reaction optimum;

2. To heat up any portions of the catalyst which may tend to be decreased in temperature much below the reaction optimum.

In practice, sufficient heat is generated by the exothermic reaction taking place within the catalyst to provide more than enough heat to warm the incoming gases and to maintain the catalyst temperature when the process and apparatus are operated at practical space velocities, i. e., about 10,000–20,000 cu. ft. of gas (measured under standard conditions) per hour per cu. ft. of catalyst. In fact, an excess of heat is usually generated. To control the temperature of the catalyst it is necessary to dilute the hot gases from the heat interchanger with cold gas, so that the mean temperature of the catalyst will not be raised too high. The cooling means have previously been described, but it may be here pointed out that the present installation is distinctive in providing of such cooling means outside of the catalyst, and circulating the entire cooled gas mixture through the entire mass of catalyst. To accurately observe the temperature within the converter, pyrometers are located at convenient points, as above explained, and the supply of cold gas may be regulated manually or by suitable electrical connection to the indicating pyrometers.

In the foregoing description of the invention, it has been assumed that the process and apparatus was in operation and that the catalyst was at the proper reaction temperature. Actually, in starting up the process and apparatus, it is of course necessary to provide some outside source of heat. The process and apparatus may be put into operation by supplying previously heated gases to inlet 16. The simplest procedure is merely to pass the mixture of hydrogen and carbon oxides through some suitable gas heater and to convey them hot into the converter. On account of the massiveness of the apparatus, the heated gases must be passed into the converter for a considerable period before it is raised to reaction temperature, and as soon as the catalyst has been raised in temperature to a point where the methanol reaction starts, the heat of the reaction also assists in raising the converter temperature provided that no cold gas is passed into the converter.

In place of supplying hot gases to the converter, it is of course possible to heat the catalyst sufficiently to start the methanol reaction by means of an electric heating element which may be positioned within the converter and in contact with the catalyst.

The improved process and apparatus, as above described, may be employed for the production of synthetic methanol with various catalysts and gas mixtures already known in the art. For example, when a gas mixture comprising 10% of carbon dioxide and 90% hydrogen is passed through the apparatus at a space velocity of 12,000 and at a reaction temperature of 400° C. in contact with a catalyst of the type described in Woodruff and Bloomfield's U. S. Patent 1,625,929, i. e., a mixture of zinc oxide, chromium oxide, iron oxide, and zinc chloride, there is produced an hourly yield of methanol amounting to about 6.5 gallons per cubic foot of catalyst together with an equivalent amount of water. If the gas mixture supplied to the process and apparatus consists of 10% carbon monoxide and 90% hydrogen, the other conditions remaining the same, the hourly yield of the methanol is about 10 gallons per cubic foot of catalyst.

In the place of the catalyst mentioned, other catalysts such as those described in United States Patents 1,625,924; 1,625,925; 1,625,926; 1,625,927; 1,625,928; and 1,625,929 may be employed.

While the apparatus has been described particularly for the use in the synthesis of methanol from carbon oxides and hydrogen, it may obviously be employed for the catalytic manufacture of other materials, such for instance, as ammonia, higher alcohols, synthol, etc., and it will be apparent that many modifications of the details of the construction of the converter herein illustrated may be made without substantially affecting the essentials of the construction thereof, and it will be understood that it is therefore desired to comprehend within the scope of the invention such modifications as may be necessary to adapt it to varying conditions and uses.

This is a division of my co-pending application, U. S. Serial No. 310,843, filed October 6, 1928 and entitled "Catalytic apparatus".

What is claimed is:

1. In an apparatus for carrying out exothermic chemical reactions, the combination within a converter shell of adjacent intercommunicating heat exchanger and reaction chambers, an inlet opening into the heat exchanger for introduction of cold reactants therein, a communicating passage for passing said heated reactants from the heat exchanger to the reaction chambers, means for passing heated reactants in thermal contact with all the catalysts contained in the reaction chambers, a plurality of inlets for introduction of cold reactants into the stream of said hot reactants and into thermal but not direct contact with the catalyst at a plurality of points throughout the catalyst mass in addition to those points necessary to accommodate for the normal heat gradient of the catalyst, means for severally controlling the rates of flow of said cold reactants through said inlets, means for passing the mixture of said reactants through all of the catalyst, and means for passing the reaction products through the heat interchanger in thermal contact with the reactants.

2. In an apparatus for carrying out exothermic chemical reactions the combination within a converter shell of adjacent intercommunicating heat interchanger and reaction chambers, a plurality of catalyst-containing tubes within said reaction chamber and communicating with said heat interchanger, means for introducing cold reactants into said heat interchanger in thermal contact with outgoing reaction products, means for passing the heated reactants into the said reaction chamber in thermal contact with said catalyst, inlets opening into the reaction chamber externally of but adjacent to the catalyst tubes to introduce cold reactants in thermal contact with said catalyst tubes at a plurality of points in addition to those points necessary to accommodate for the normal heat gradient of said catalyst, means for severally controlling the rates of flow of said cold reactants through said inlets, means for passing all of said reactants in direct contact with the catalyst and means for passing the reaction products through the heat interchanger in thermal contact with the reactants.

3. In an apparatus for carrying out exothermic chemical reactions the combination within a converter shell of adjacent intercommunicating heat interchanger and reaction chambers spaced apart from said shell and forming an annular chamber therewith, a plurality of catalyst-containing tubes in the reaction chamber the said tubes communicating with the said annular space and also with the said heat interchanger, means for introducing reactants into said heat interchanger in thermal contact with outgoing reaction products, means for passing the heated reactants into the reaction chamber in thermal contact with said catalyst tubes, means opening into the reaction chamber externally of but adjacent to the catalyst tubes to introduce cold reactants in thermal contact with the catalyst tubes at a plurality of points in addition to those points necessary to accommodate for the normal heat gradient of said catalyst, an inlet for introducing cold reactants into the said annular space between the shell and the reaction chamber and heat interchanger, means for severally controlling the rates of flow of said cold reactants through said inlets, means for passing all of said reactants in direct contact with the catalyst and means for passing the reaction products through the heat interchanger in thermal contact with the reactants.

4. In an apparatus for carrying out exothermic chemical reactions the combination with a converter shell of adjacent intercommunicating heat exchanger and reaction chambers within the shell and spaced apart therefrom, thereby defining an annular space between themselves and shell, the reaction chamber being adapted to contain a catalyst, an inlet opening into the heat exchanger for the introduction of reactants therein, means for passing the heated reactants from the heat interchanger throughout the reaction chamber in thermal contact with the catalyst, inlets for admitting cold reactants into the stream of said heated reactants and into thermal but not direct contact with the catalyst at a plurality of points throughout the catalyst mass in addition to those points necessary to accommodate for the normal heat gradient of the catalyst, an inlet for introducing cold reactants into the said annular space between the shell and the reaction chamber and heat interchanger, means for severally controlling the rates of flow of said cold reactants through said inlets, means for passing all of said reactants in direct contact with the catalyst and means for passing the reaction products through the heat interchanger in thermal contact with the reactants.

WILLIAM J. EDMONDS.